United States Patent [19]
Kim

[11] Patent Number: 6,055,301
[45] Date of Patent: *Apr. 25, 2000

[54] APPARATUS AND INFORMATION SERVICE METHOD THROUGH AUTOMATIC PRINT FUNCTION IN A FACSIMILE SYSTEM

[75] Inventor: Sung-Hyun Kim, Gumi, Rep. of Korea

[73] Assignee: SamSung Electronics Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/792,678

[22] Filed: Jan. 29, 1997

[30] Foreign Application Priority Data

Jan. 29, 1996 [KR] Rep. of Korea ......................... 96 1924

[51] Int. Cl.[7] .............................. H04N 11/00; H04N 1/00
[52] U.S. Cl. ................................ 379/100.14; 379/100.11; 358/403
[58] Field of Search ........................... 358/400, 402–403, 358/407, 434; 379/100.04–100.06, 100.08–100.09, 100.11, 100.14–100.15, 355, 88.21, 93.09; 345/172

[56] References Cited

U.S. PATENT DOCUMENTS

| | | | |
|---|---|---|---|
| 4,646,160 | 2/1987 | Iizuka et al. | 379/100.14 |
| 5,090,049 | 2/1992 | Chen | 379/100.09 |
| 5,095,373 | 3/1992 | Hisano | 358/403 |
| 5,196,943 | 3/1993 | Hersee et al. | 348/403 |
| 5,224,156 | 6/1993 | Fuller et al. | 379/100.08 |
| 5,287,201 | 2/1994 | Soumiya et al. | 358/434 |
| 5,367,564 | 11/1994 | Sutoh et al. | 358/402 |
| 5,369,689 | 11/1994 | Kawamura | 379/100.14 |
| 5,384,830 | 1/1995 | Ide | 358/403 |
| 5,392,131 | 2/1995 | Umeno | 379/100.14 |
| 5,483,580 | 1/1996 | Brandman et al. | 379/100.98 |
| 5,517,557 | 5/1996 | Tanaka | 379/93.09 |
| 5,521,716 | 5/1996 | Itoh | 358/402 |
| 5,523,854 | 6/1996 | Hornsby | 358/403 |
| 5,532,838 | 7/1996 | Barbari | 358/403 |
| 5,581,366 | 12/1996 | Merchant et al. | 358/400 |

FOREIGN PATENT DOCUMENTS

| | | | |
|---|---|---|---|
| WO95/04426 | 2/1995 | WIPO | H04M 11/00 |
| WO95/04428 | 2/1995 | WIPO | H04M 11/00 |

*Primary Examiner*—Curtis A. Kuntz
*Assistant Examiner*—George Eng
*Attorney, Agent, or Firm*—Robert E. Bushnell, Esq.

[57] ABSTRACT

A method of automatically calling an appointed telephone number at an appointed time during an established cycle in a facsimile system, comprising the steps of: entering, according to inputs from an operational panel, the established cycle representing a cycle set on one of a daily basis, a weekly basis and a monthly basis, the appointed time within the established cycle, and the appointed telephone number of a service station; recording the established cycle, the appointed time and the appointed telephone number of the service station successively in a memory; providing a visual display of a current time and the appointed time; and automatically dialing the appointed telephone number of the service station at the appointed time during each established cycle; receiving service information from the service station and printing the same via a printer, when communication is established with a receiver corresponding to the appointed telephone number of the service station.

11 Claims, 5 Drawing Sheets

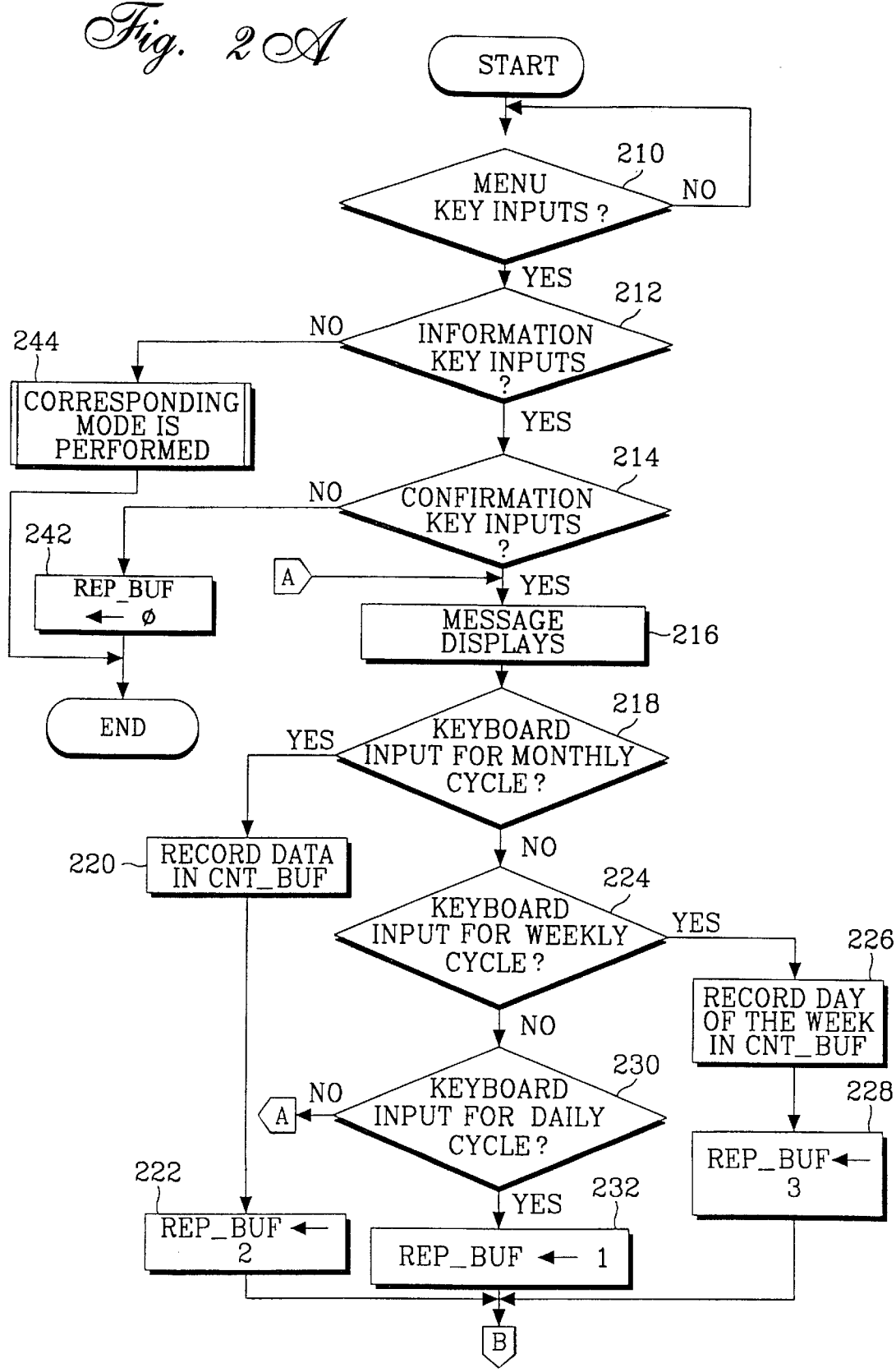

APPARATUS AND INFORMATION SERVICE METHOD THROUGH AUTOMATIC PRINT FUNCTION IN A FACSIMILE SYSTEM

CLAIM FOR PRIORITY UNDER 35 U.S.C. §119

This application makes reference to, incorporates the same herein, and claims all benefits accruing under 35 U.S.C. §119 from an application for Method Of Automatically Printing Out Data By Facsimile earlier filed in the Korean Industrial Property Office on Jan. 29, 1996, and there duly assigned Ser. No. 1924/1996.

BACKGROUND OF THE INVENTION

1. Technical Field

The present invention generally relates to a facsimile system, and more particularly, relates to a facsimile system and method for enabling a user to set a time cycle, an appointed time in the time cycle, telephone number of a service station within a facsimile system, and for automatically dialing the appointed telephone number of the service station at the appointed time in the set time cycle to receive service information from the service station and print out the same at the facsimile system.

2. Background Art

Generally, a facsimile system provides a function of automatically receiving a facsimile message in response to an incoming call during a user's absence, so that the user may obtain the received facsimile message upon return. In addition, if the facsimile system has an automatic answering function as disclosed, for example, in U.S. Pat. No. 5,287,201 for Calling Receiving Method And Apparatus issued to Soumiya et al., and U.S. Pat. No. 5,517,557 for Facsimile Apparatus With Automatic Telephone Answering Function issued to Tanaka, a facsimile module, an attached telephone and a recording device are included for facsimile communication, telephone communication and recording a voice message from a caller. Typically, the facsimile system is connected directly via a telephone line for access to the public switched telephone network. When a remote caller wants to call or send a facsimile message to the host facsimile system, the caller accesses to the facsimile system by dialing its telephone number via a remote telephone or a remote facsimile system. If a caller sends a signal via a telephone when the facsimile system answers in a telephone/facsimile mode, telephone conversation is permitted. If the caller sends a signal via a remote facsimile system when the facsimile system answers in the same telephone/facsimile mode, facsimile communication is permitted. On the other hand, if the caller sends a signal via a telephone when the facsimile system answers in an answering/facsimile mode, an answering message is transmitted to the caller upon signal reception and a voice message from the caller is recorded. If the caller sends a signal via a remote facsimile system when the facsimile system answers in the answering/facsimile mode, facsimile communication is permitted.

A facsimile message recorded in a host facsimile system can also be forwarded to an intended recipient who does not have physical access to his or her host facsimile system but can call his or her host facsimile system from a remote location and then direct the facsimile message recorded in the host facsimile system be transmitted for printout to a fully accessed remote facsimile system. Such facsimile system works like a "mail box" such as disclosed in U.S. Pat. No. 5,090,049 for Fax Message Recorder And Relay System And Method issued to Chen, and U.S. Pat. No. 5,483,580 for Methods And apparatus For Non-Simultaneous Transmittal And Storage Of Voice Message And Digital Text Or Image issued to Brandman et al. In Chen '049, for example, a separate fax message recorder and relay system operates in conjunction with a host facsimile system to allow an authorized caller to remotely control the location to which a facsimile message is to be forwarded. Generally, a conventional "fax mail" system is used to store an incoming facsimile message in an electronic format for later recall by a system subscriber. In this manner, the intended recipient can, for example, call into the office from a remote location, determine that a facsimile transmittal is available for him or her, and then direct that the text or image stored in the system be transmitted for printout to a remote facsimile machine.

In recent years however, as facsimile equipment is becoming increasingly common both in the workplace as well as in the home office, facsimile technology becomes more desirable as a means to periodically service information such as news, learned journals and the like as well as to efficiently market products and to effectively educate consumers about the products in a less costly manner. Traditional use of a computer database on a host computer to deliver information to a remote user via a facsimile system such as disclosed in U.S. Pat. No. 5,196,943 for Facsimile Information Distribution Apparatus issued to Hersee et al., and U.S. Pat. No. 5,532,838 for Method And Apparatus For Dynamically Creating And Transmitting Documents Via Facsimile Equipment issued to Barbari, is cost prohibitive particularly when the business is small or medium size and capital expenditure is limited. While a local facsimile system can be configured to retain information so that customers or users can access a facsimile system of the service office directly for service information, an existing local facsimile system must require that the customers to first request for such service information via a telephone and manually enter a request via an operational panel in response to the service office's prerecorded message, and then wait for reception of such service information for a printout via a remote facsimile system. This requirement, however, is not efficient because much time and efforts are wasted. Moreover, urgent information such as news flashes cannot be timely delivered to the customers if the customers forget to call in the service office.

SUMMARY OF THE INVENTION

Accordingly, it is an object of the present invention to provide a new and improved facsimile system and process.

It is also an object to provide an improved facsimile system capable of automatically calling a telephone number of a service office at a user-selected time to receive service information from the service office.

It is another object of the present invention to provide an improved facsimile system capable of automatically printing out service information periodically furnished from a service office at a user-selected time on a user-selected day.

These and other objects of the present invention can be achieved by a facsimile system and process of automatically calling an appointed telephone number at an appointed time during an established cycle in a facsimile system, comprising the steps of: entering, according to inputs from an operational panel, the established cycle representing a cycle set on one of a daily basis, a weekly basis and a monthly basis, the appointed time within the established cycle, and the appointed telephone number of a service station; recording the established cycle, the appointed time and the appointed telephone number of the service station successively in a memory; providing a visual display of a current time and said appointed time; and automatically dialing the appointed telephone number of the service station at the appointed time during each established cycle; receiving service information from the service station and printing the same via a printer, when communication is established with a receiver corresponding to the appointed telephone number of the service station.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 2A and 2B are flow charts illustrating a control sequence of a facsimile system operable in a recording mode according to the principles of the present invention;

DETAILED DESCRIPTION OF THE PREFERRED EMBODIMENT

Figure 1:
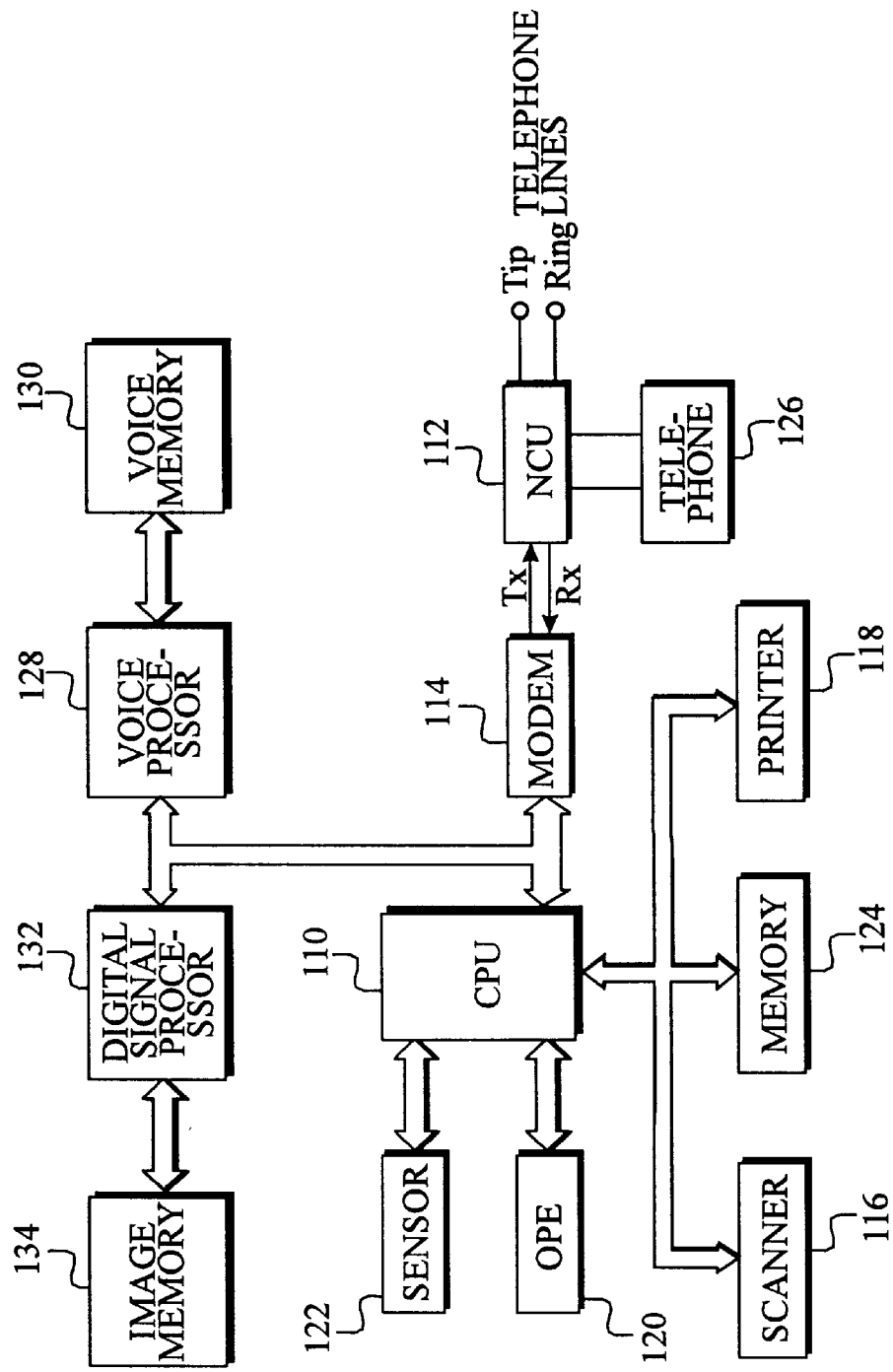
FIG. 1 is a block diagram of a facsimile system or facsimile apparatus having an automatic information service constructed according to the principles of the present invention.

Referring now to the drawings and particularly to FIG. 1, which illustrates a facsimile system or facsimile apparatus having an automatic information service function as constructed according to the principles of the present invention. The facsimile system includes a central processing unit (CPU) 110 for controlling operations of the facsimile system, a network control unit (NCU) 112 connected to a tip and ring terminal of a telephone line, a modem 114, scanner 116, a printer 118, an operational panel OPE 120, a sensor 122, a memory 124, a telephone 126 connected in parallel to the NCU 112, and optionally a voice processor 128, a voice memory 130, a digital signal processor 132, and an image memory 134.

The memory 124 includes a program memory such as a ROM (not shown) which stores programs for the CPU 110 to control the general operation of the facsimile system for transmission or reception of image data from another communication system such as a telephone or a remote facsimile system, a data memory such as a RAM (not shown) which temporarily stores a variety of items of information, including service information relating to a time cycle, an appointed or selected time in the time cycle and a telephone number of the service station recorded by the user. The operational panel (OPE) 120 includes a key input unit comprising a plurality of alpha-numeric keys and function keys that are independently operable by manual depression to provide key data to the CPU 110 to dial a telephone number of a counterpart communication system, and a display unit having a clock chip incorporated therein for continuously providing a visual display of data indicating various modes of operations of the facsimile system including a current time of operation of the facsimile system. The sensor 122 senses whether a document is input into the facsimile system, or whether copy paper is stored and available for use, and generates an indicative signal to the CPU 110. The scanner 116 transports and scans an image of the input document and then generates image data corresponding to the scanned image. The image data output from the scanner 116 is then processed for either transmission via a telephone line or copy during the copy mode under control of the CPU 110. The printer 118 prints the processed image data received from the CPU 110 on a printable medium such as individual cut sheets of paper during the reception mode and the copy mode under the control of the CPU 110. The modem 114 modulates the processed image data output from the CPU 110 into a modulated image signal for transmission, and duplicates the image signal input to the CPU 110 during the reception mode under the control of the CPU 110. The NCU 112 is connected with a tip and ring terminals of a telephone line to form transmission and reception paths for the modem 114 under the control of the CPU 110. The telephone 126 is connected in parallel to the NCU 112 to allow voice communication under the control of the CPU 110.

Optionally, voice memory 130 is used to store a voice guide message in a form of digital data recorded to guide the user to record a time cycle, an appointed or selected time in the time cycle, a telephone number of a service station within the memory 124 of the facsimile system. The voice processor 128 synthesizes the voice guide message stored in the voice memory 130 to a voice signal under the control of the CPU 110 to thereby output the same to speaker of the telephone 126 via the MODEM 114. In addition, the voice processor 128 also processes the message received from the user into digital data to thereby store the same in the voice memory 130 for guiding the subsequent user to record the time cycle, the appointed or selected time in the time cycle, the telephone number of the service station within the memory 124. The digital signal processor 132 encodes/decodes image data outputted from the scanner 116 or received image data. The image memory 134 is used to store service image information such as news, learned journals and the like from the service office for later print out if a delay mode is initiated from the OPE 120. In a preferred embodiment of the present invention, the memory 124, the voice memory 130 and the image memory 134 can be collectively embodied in a single memory device.

Figure 2B:
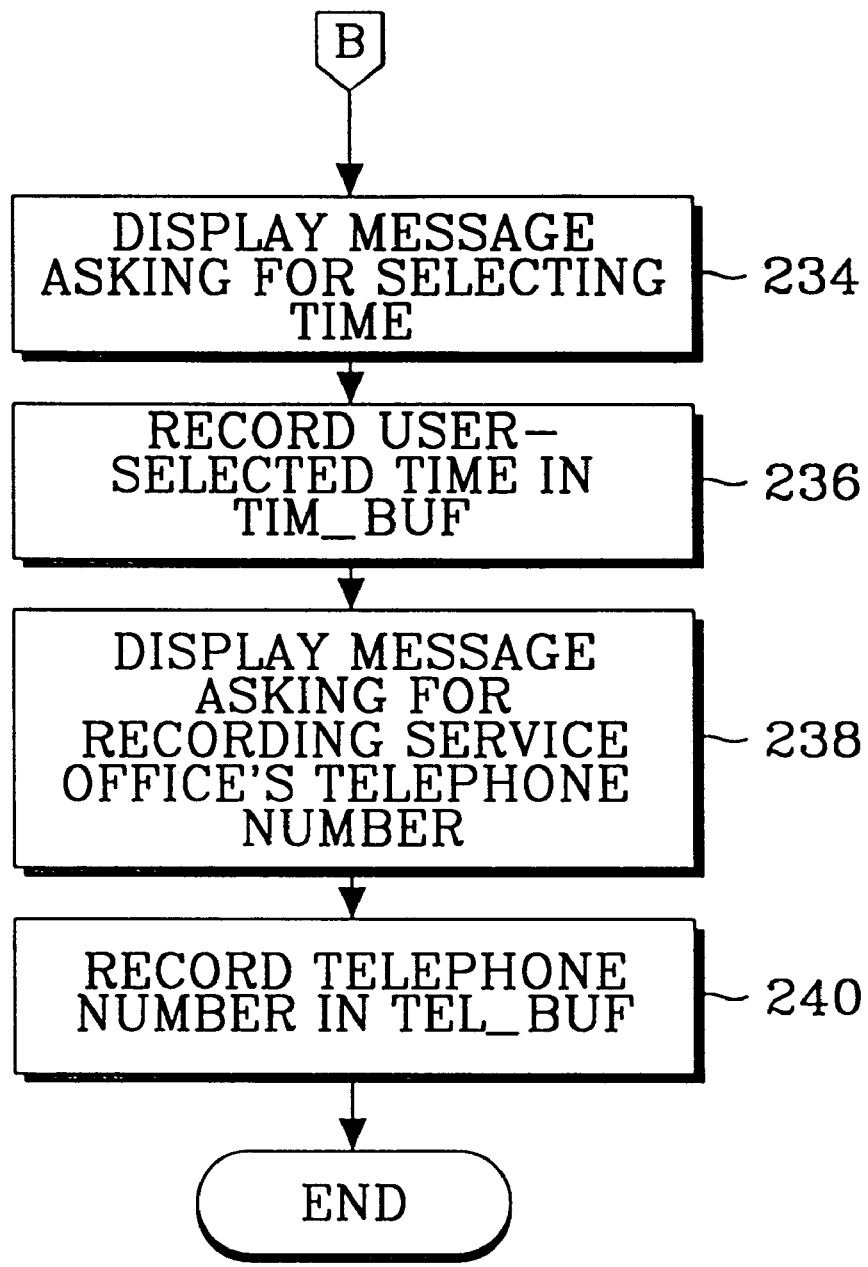

Turning now to FIGS. 2A and 2B which collectively illustrate a control sequence of the facsimile system as shown in FIG. 1 that is operable in a recording mode according to the principles of the present invention. The facsimile recording mode is realized through the steps of setting a cycle of automatically printing out data furnished by a service office once a recording mode key is input via the OPE 120; selecting a time to print out the information data to be received from the service office according to the preset cycle; recording a telephone number of the service office; and recording data reporting that the automatic information service is not requested when there is no recorded data.

Figure 3:
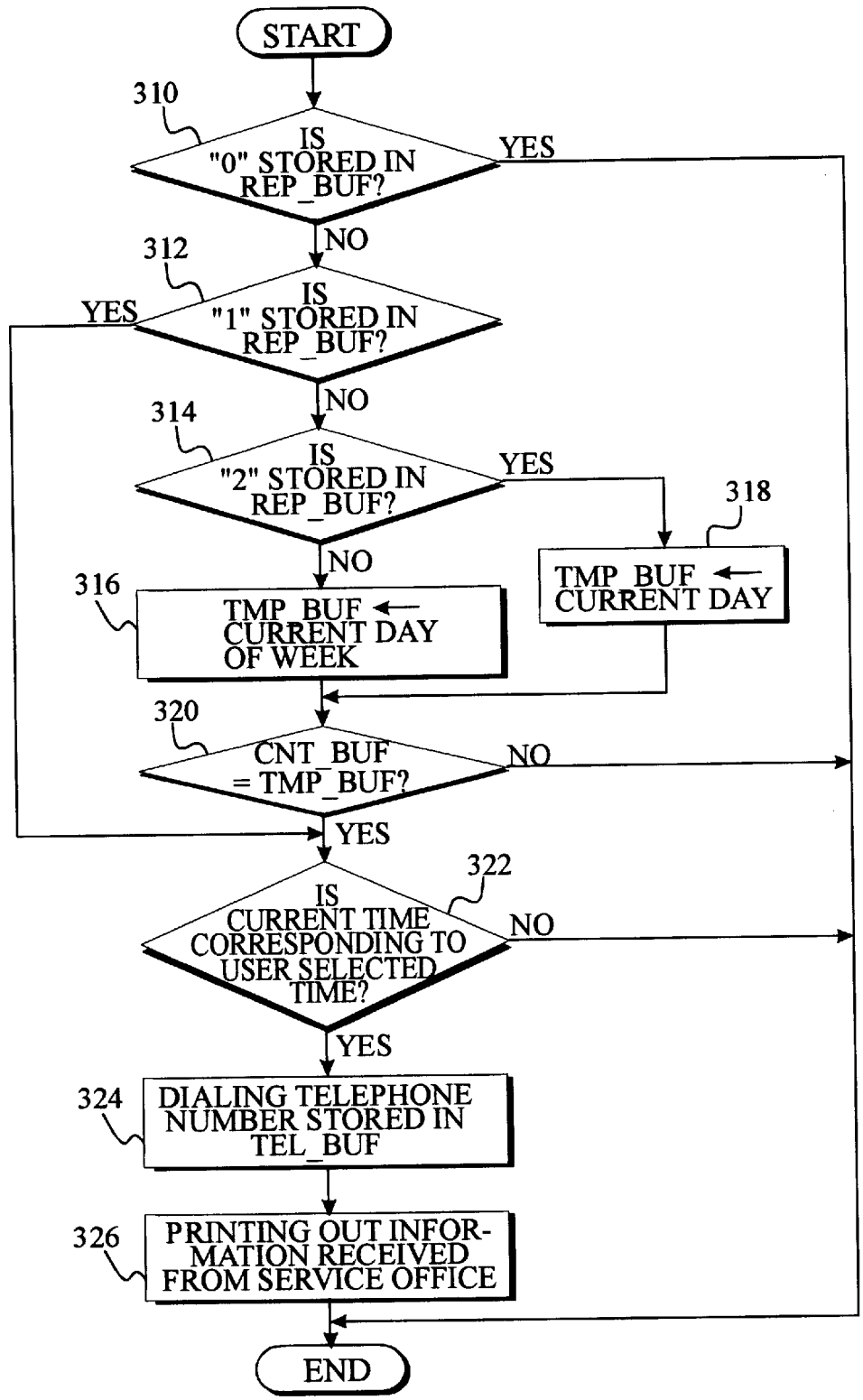
FIG. 3 is a flow chart illustrating a control sequence of a facsimile system operable in an information service mode according to the principles of the present invention.

FIG. 3 illustrates a control sequence of the facsimile system as shown in FIG. 1 that is operable in an information service mode according to the principles of the present invention. The information service mode is realized through the steps of detecting if a cycle for automatic information service has arrived when the automatic information service is requested; when the cycle for automatic information service has arrived, determining if the user-selected time has reached; when the user-selected time has reached in the preset cycle, dialing the prerecorded telephone number of the service office, receiving the information from the service office to print the same information out at the facsimile system.

Figure 4A:
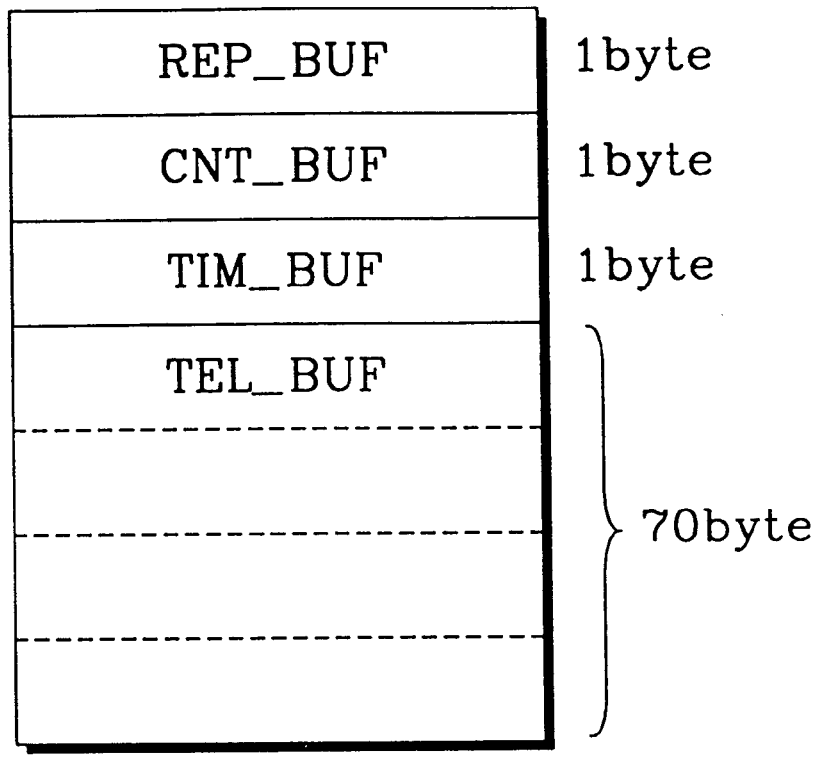
FIGS. 4A and 4B illustrate the structure of a memory constructed according to the principles of the present invention.
Figure 4B:

FIGS. 4A and 4B illustrate the construction of a memory 124 into which data information is written for the automatic information service according to the principles of the present invention. The memory 124 includes a cycle setting data buffer region (REP_BUF) composed of 1 byte in size, and when a cycle of printing out data automatically has not been determined yet, "0" is stored. When the cycle is set on a daily basis, "1" is stored. If the cycle is set on a "monthly" or "weekly" basis, "2" or "3" is stored.

A cycle data buffer region (CNT_BUF) is composed of 1 byte in size, and if a cycle of printing out data automatically is set on a "monthly" basis, the date on which incoming data is printed out is stored. When the cycle is set on a "weekly" basis, a day of the week at which incoming data is printed out is stored. This day of the week is replaced by a corresponding numeral to be stored in the memory 124.

A user-selected time buffer region (TIM_BUF) is composed of 1 byte in size, and the time for automatically printing out data according to the prerecorded cycle is stored therein. The recording of the time is performed on the basis of round-the-clock system. A telephone number buffer region (TEL_BUF) is composed of 70 bytes in size, and stores the telephone number of a service office which furnishes the desired information to the user.

The first preferred embodiment of the present invention will be described in detail with reference to FIG. 2A to FIG. 4B.

Referring to FIG. 2A, the CPU 110 determines whether there is a menu key input from the OPE 120 selecting an operational mode at step 210. When there is a menu key input from the OPE 120, the CPU 110 determines whether there is an information key input from the OPE 120 requesting an automatic information service mode at step 212. When there is no information key input from the OPE 120, the CPU 110 performs the appropriate function according to the keyboard input at step 244. When there is an information key input from the OPE 120, however, the CPU 110 determines if a set key for confirmation is input from the OPE 120 at step 214. When the set key is not input from the OPE 120, the CPU 110 stores "0" in the REP_BUF region of the memory 124 to report that there is no data stored in the memory 122 to thereby complete the recording process.

If the set key is input from the OPE 120, however, the CPU 110 proceeds to step 216 and controls the display unit of the OPE 120 to provide a visual display of a prerecorded message asking the user to set a cycle of printing out service information to be received from the service office. The CPU 110 determines whether numeric keys for setting the cycle are input from the OPE 120 for the monthly cycle, the weekly cycle and daily cycle at each of steps 218, 224 and 230 in response to the message appearing on the display unit at step 216. If a numeric key "1" is input from the OPE 120 at step 230, the CPU 110 proceeds to step 232 to store the number "1" indicating that the cycle is set on a daily basis in the REP_BUF region of the memory 124. If a numeric key "2" is input from the OPE 120 at step 218, the CPU 110 proceeds to step 220 to record the date input from the OPE 120 in the CNT_BUF of the memory 122. Then, the CPU 110 stores the number "2" indicating that the cycle is set on a monthly basis in the REP_BUF of the memory 122 at step 222. If a numeric key "3" indicating that the cycle is set on a weekly basis is input from the OPE 120, however, the CPU 110 stores a day of the week input from the OPE 120 in the CNT_BUF of the memory 122 at step 226. Then, the CPU 110 stores the number "3" in the REP_BUF region of the memory 124 at step 228.

Once the cycle of printing out service information data to be received from the service office is set, the CPU 110 proceeds to step 234 as shown in FIG. 2B to control the display unit of the OPE 120 to provide a visual display of a prerecorded message asking the user to select the time for printing out the service information data for each cycle. After the user selects the time for printing out the service information data for each cycle, the CPU 110 records the user-selected time input from the OPE 120 in the TIM_BUF region of the memory 124 in response to the message displayed at step 234. The CPU 110 then proceeds to step 238 to control the display unit of the OPE 120 to provide a visual display of a prerecorded message asking the user to input a corresponding service office's telephone number. After the user inputs the telephone number of the service office, the CPU 110 records the telephone number input from the OPE 120 in the TEL_BUF of the memory 124 in response to the message at step 240. As the recording of the telephone number is completed, the recording mode terminates.

Referring to FIG. 3, the procedure of the automatic information service mode is now described in detail as follows.

The CPU 110 analyzes the data for setting the cycle recorded in the REP_BUF region of the memory 124 at steps 310, 312 and 314. When the CPU 110 determines that the number "0" is recorded in the REP_BUF region of the memory 124 at step 310, there is no automatic information service mode being established. As a result, the program terminates. If the CPU 110 determines that the number "1" is recorded in the REP_BUF region of the memory 124, however, the CPU 110 interprets this as the cycle of the automatic information service recorded for a daily basis, and proceeds directly to step 322. At step 322, the CPU 110 compares the current time read out from its clock chip RTC with the user-selected or appointed time recorded in the TIM_BUF region of the memory 124 to determine whether the current time corresponds to the user-selected time recorded in the TIM_BUF region of the memory 124. If the current time corresponds to the user-selected time recorded in the TIM_BUF region of the memory 124, the CPU 110 reads the telephone number of the service office recorded in the TEL_BUF region of the memory 124, controls the NCU 112 to establish a communication loop, and automatically dials the telephone number of the service office via the modem 114 at step 324. Once the communication is established, the CPU 110 proceeds to step 326 to receive the service information furnished from the service office and prints the same information through the printer 118.

If the CPU 110 determines that the number "2" is recorded in the REP_BUF region of the memory 124, the CPU 110 interprets this as the cycle of the automatic information service recorded for a "monthly" basis, and proceeds to step 318. The CPU 110 reads the current date from the clock chip RTC and stores the same in a temporary buffer TMP_BUF region of the memory 124. Then, the CPU 110 compares the date recorded in the TMP_BUF region of the memory 124 with the user selected day recorded in the CNT_BUF region of the memory 124 at step 320. When the date recorded in the TIM_BUF region of the memory 124 corresponds to the user-selected day recorded in the CNT_BUF region of the memory 124, the CPU 110 compares the current time read out from its clock chip RTC with the user-selected or appointed time recorded in the TIM_BUF region of the memory 124 at step 322 to determine whether the current time corresponds to the user-selected selected time recorded in the TIM_BUF region of the memory 124. Again, if the current time corresponds to the user-selected time recorded in the TIM_BUF region of the memory 124, the CPU 110 reads the telephone number of the service office recorded in the TEL_BUF region of the memory 124, controls the NCU 112 to establish a communication loop, and automatically dials the telephone number of the service office via the modem 114 at step 324. Once the communication is established, the CPU 110 proceeds to step 326 to receive the service information furnished from the service office and prints the same information through the printer 118.

In addition, if the CPU 110 determines that "0", "1" or "2" is not recorded in the REP_BUF region of the memory 124, the CPU 110 interprets this as the cycle being set on a "weekly" basis and proceeds to step 316. There, the CPU 110 reads the day of the week out of the clock chip RTC and stores the same in the TMP_BUF region of the memory 124. The CPU 110 determines whether the day of the week recorded in the TMP_BUF region corresponds the user-selected day of the week recorded in the CNT_BUF region of the memory 124 at step 320. When the CPU 110 determines that the day of the week recorded in the TMP_BUF region corresponds to the user-selected day of the week recorded in the CNT_BUF region of the memory 124, the CPU 110 compares the current time read from its clock chip RTC with the time recorded in the TIM_BUF region of the memory 124 at step 322. Again, if the current time corresponds to the user-selected time recorded in the TIM_BUF region of the memory 124, the CPU 110 reads the telephone number of the service office recorded in the TEL_BUF region of the memory 124, controls the NCU 112 to establish a communication loop, automatically dials the telephone number of the service office via the modem 114 at step 324, and receives the service information furnished from the service office for a print out through the printer 118 at step 326. When the CPU 110 determines that the day of the week recorded in the TMP_BUF region does not correspond to the user-selected day of the week recorded in the CNT_BUF region of the memory 124, however, the CPU 110 terminates the program. Lastly, the CPU 110 also controls the redialing of the telephone number recorded in the TEL_BUF region of the memory 124 periodically for a given time interval when a receiver corresponding to the telephone number of the service office is not earlier contacted at the user-selected time during the set cycle. A reset key is also included in the OPE 120 to allow the user to input new cycle, new selected time and new telephone number each time if any of the previous inputs were erroneous. As an option, the CPU 110 may be configured to quickly allow the user to erase the set cycle, the user-selected time, the recorded telephone number from the memory 124 in response to, for example, an erase key from the OPE 120.

As described above, the present invention advantageously allows the user to obtain various items of service information periodically furnished from a service office conveniently and promptly at a user-selected time and date at his or her facsimile system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A method for automatically calling an appointed telephone number at an appointed time during an established cycle in a facsimile apparatus, comprising the steps of:

entering, according to inputs by a user from an operational panel of the facsimile apparatus, said established cycle representing a cycle set on one of a daily basis, a weekly basis and a monthly basis, said appointed time within said established cycle, and said appointed telephone number of a service station;

recording said established cycle, said appointed time and said appointed telephone number of the service station successively in a memory of the facsimile apparatus, said recording said established cycle in said memory of the facsimile apparatus comprising the steps of:

when a first numeric key for setting said established cycle on a monthly basis is input from said operational panel, recording data reflecting said established cycle corresponding to said first numeric key and a date according to said established cycle in said memory of the facsimile apparatus;

when a second numeric key for setting said established cycle on a weekly basis is input from said operational panel, recording data reflecting said established cycle corresponding to said second numeric key and a day of the week according to said established cycle in said memory of the facsimile apparatus; and alternatively when a third numeric key for setting said established cycle on a daily basis is input from said operational panel, recording data reflecting said established cycle corresponding to said third numeric key in said memory of the facsimile apparatus;

providing a visual display of a current time and said appointed time;

automatically dialing by the facsimile apparatus said appointed telephone number of the service station at said appointed time during each established cycle for periodically directly establishing by the facsimile apparatus a communication loop with the service station to directly receive by the facsimile apparatus service information from the service station; and receiving by the facsimile apparatus service information from the service station and printing the service information received via a printer, when communication is established with a receiver corresponding to said appointed telephone number of the service station.

2. The method of claim 1, further comprising the step of redialing said appointed telephone number of the service station periodically for a given time interval to establish communication with said receiver corresponding to said appointed telephone number of the service station, when said receiver is not earlier contacted at said appointed time.

3. The method of claim 1, further comprising the step of erasing said established cycle, said appointed time and said appointed telephone number from said memory of the facsimile apparatus in response to input of an erase key from said operational panel.

4. The method of claim 1, further comprising the steps of:
when data for setting said established cycle on a monthly basis is recorded in said memory of the facsimile apparatus, determining whether the recorded date read from said memory of the facsimile apparat corresponds to the current date so as to automatically dial said appointed telephone number of the service station at said appointed time within said established cycle to receive the service information from the service station for a print out via said printer;
when data for setting said established cycle on a weekly basis is recorded in said memory of the facsimile apparatus, determining whether the recorded day of the week read from said memory of the facsimile apparatus corresponds to the current day of the week so as to automatically dial said appointed telephone number of the service station at said appointed time within said established cycle to receive the service information from the service station for a print out via said printer; and
when data for setting said established cycle on a daily basis is recorded in said memory of the facsimile apparatus, automatically dialing said appointed telephone number of the service station at said appointed time within said established cycle to receive the service information from the service station for a print out via said printer.

5. A method for automatically calling an appointed telephone number of a service station at an appointed time within an established cycle in a facsimile apparatus, comprising the steps of:
entering, according to inputs from an operational panel of said facsimile apparatus, an established cycle representing a cycle set for one of a daily basis, a weekly basis, and a monthly basis;
recording said established cycle in a first memory region of said facsimile apparatus, said recording said established cycle comprising the steps of:
when a first numeric key for setting said established cycle on a monthly basis is input from said operational panel, recording data reflecting said established cycle corresponding to said first numeric key and a date according to said established cycle in said first memory region of said facsimile apparatus;
when a second numeric key for setting said established cycle on a weekly basis is input from said operational panel, recording data reflecting said established cycle corresponding to said second numeric key and a day of the week according to said established cycle in said first memory region of said facsimile apparatus; and
alternatively, when a third numeric key for setting said established cycle on a daily basis is input from said operational panel, recording data reflecting said established cycle corresponding to said third numeric key in said first memory region of said facsimile apparatus;
entering, according to inputs from said operational panel of said facsimile apparatus, an appointed time within said established cycle;
recording said appointed time in a second memory region of said facsimile apparatus;
entering, according to inputs from said operational panel of said facsimile apparatus, an appointed telephone number of the service station;
recording said appointed telephone number of the service station in a third memory region of said facsimile apparatus;
determining when a current time corresponds to said appointed time within said established cycle;
automatically dialing by the facsimile apparatus said appointed telephone number of the service station when said current time corresponds to said appointed time within said established cycle for directly establishing by the facsimile apparatus a communication loop with the service station; and
receiving service information from said service station and printing the service information received via a printer, when communication is established with a receiver corresponding to said appointed telephone number of the service station.

6. The method of claim 5, further comprising the step of re-dialing said appointed telephone number periodically for a given time interval to establish communication with said receiver corresponding to said appointed telephone number of the service station, when communication is not made with said receiver corresponding to said appointed telephone number at said appointed time.

7. The method of claim 5, further comprising the steps of:
when data for setting said established cycle on a monthly basis is recorded in said first memory region of said facsimile apparatus, determining whether the recorded date read from said first memory region of said facsimile apparatus corresponds to the current date so as to automatically dial said appointed telephone number of the service station at said appointed time within said established cycle to receive the service information from the service station for a print out via said printer;
when data for setting said established cycle on a weekly basis is recorded in said fist memory region of said facsimile apparatus, determining whether the recorded day of the week read from said first memory region of said facsimile apparatus corresponds to the current day of the week so as to automatically dial said appointed telephone number of the service station at said appointed time within said established cycle to receive the service information from the service station for a print out via said printer; and
when data for setting said established cycle on a daily basis is recorded in said first memory region of said facsimile apparatus, automatically dialing said appointed telephone number of the service station at said appointed time within said established cycle to receive the service information from the service station for a print out via said printer.

8. A facsimile apparatus for automatically dialing an appointed telephone number of a service station at an appointed time, comprising:
a memory of said facsimile apparatus for recording an established cycle representing a cycle set on one of a daily basis, a weekly basis and a monthly basis, said appointed time within said established cycle, and said appointed telephone number of the service station;
an operational panel of said facsimile apparatus including a keyboard comprising a plurality of discrete keys that are independently operable by manual depression by a user to control operation of said facsimile apparatus, and a display unit for providing a visual display of the operation of said facsimile apparatus including a display of a current time and said appointed time;
a controller of said facsimile apparatus for controlling recording of said established cycle, said appointed time within said established cycle, and said appointed telephone number of the service station into said memory of said facsimile apparatus via said keyboard, and for automatically dialing by said facsimile apparatus said appointed telephone number of the service station at said appointed time for directly establishing a communication loop with the service station for reception of service information provided from the service station when said current time reaches said appointed time within said established cycle, said controller controlling the recording of said established cycle in said memory of said facsimile apparatus by:

when a first discrete key for setting said established cycle on a monthly basis is input from said operational panel, recording data reflecting said established cycle corresponding to said first discrete key and a date according to said established cycle in said memory of said facsimile apparatus;

when a second discrete key for setting said established cycle on a weekly basis is input from said operational panel, recording data reflecting said established cycle corresponding to said second discrete key and a day of the week according to said established cycle in said memory of said facsimile apparatus; and alternatively, when a third discrete key for setting said established cycle on a daily basis is input from said operational panel, recording data reflecting said established cycle corresponding to said third discrete key in said memory of said facsimile apparatus; and a printer mechanism for printing the service information received from the service station, when communication is established with a receiver corresponding to said appointed telephone number of the service station.

9. The facsimile apparatus of claim 8, further comprised of said keyboard comprising an erase key for permitting the user to erase said established cycle, said appointed time and said appointed telephone number from said memory of said facsimile apparatus.

10. The facsimile apparatus of claim 8, wherein said controller controls re-dialing of said appointed telephone number periodically for a given time interval to establish communication with said receiver corresponding to said appointed telephone number of the service station, when said receiver corresponding to said appointed telephone number is not contacted earlier at said appointed time.

11. The facsimile apparatus of claim 8, further comprised of said controller controlling automatically dialing said appointed telephone number by:

when data for setting said established cycle on a monthly basis is recorded in said memory of said facsimile apparatus, determining whether the recorded date read from said memory of said facsimile apparatus corresponds to the current date so as to automatically dial said appointed telephone number of the service station at said appointed time within said established cycle to receive the service information from the service station for a print out via said printer mechanism;

when data for setting said established cycle on a weekly basis is recorded in said memory of said facsimile apparatus, determining whether the recorded day of the week read from said memory of said facsimile apparatus corresponds to the current day of the week so as to automatically dial said appointed telephone number of the service station at said appointed time within said established cycle to receive the service information from the service station for a print out via said printer mechanism; and when data for setting said established cycle on a daily basis is recorded in said memory of said facsimile apparatus, automatically dialing said appointed telephone number of the service station at said appointed time within said established cycle to receive the service information from the service station for a print out via said printer mechanism.

* * * * *